United States Patent [19]

Neumann

[11] Patent Number: 4,477,181
[45] Date of Patent: Oct. 16, 1984

[54] DEVICE FOR THE REPETITIVE COPYING OF ORIGINALS IN A COPIER

[75] Inventor: Juergen Neumann, Liederbach, Fed. Rep. of Germany

[73] Assignee: Hoechst Aktiengesellschaft, Frankfurt am Main, Fed. Rep. of Germany

[21] Appl. No.: 447,214

[22] Filed: Dec. 6, 1982

[30] Foreign Application Priority Data

Dec. 16, 1981 [DE] Fed. Rep. of Germany ....... 3149805

[51] Int. Cl.³ ............................................ G03G 21/00
[52] U.S. Cl. .................................. 355/3 SH; 355/75; 271/301
[58] Field of Search ...................... 355/3 SH, 75, 3 R; 271/300, 301, 302

[56] References Cited

U.S. PATENT DOCUMENTS 4,065,119 12/1977 Schroter .............................. 271/172
4,072,306 2/1978 Idstein .................................... 271/3
4,269,409 5/1981 Simonek et al. .................... 271/277

*Primary Examiner*—R. L. Moses
*Attorney, Agent, or Firm*—Schwartz, Jeffery, Schwaab, Mack, Blumenthal & Koch

[57] ABSTRACT

The present invention relates to a device for the repetitive copying of originals in a copier and comprises a pivotable separating guide which forms, with a supplementary guide-plate, a loop-compartment for the copying original, the front edge of which is gripped and guided by a gripping unit. The separating guide is composed of planar portions which adjoin one another at an obtuse angle and give the separating guide a shape which is generated by a series of discrete bends. Air nozzles direct streams of air into the loop-compartment in such a manner that during the repetitive copying process they press the copying original, which is present in the loop-compartment, against the interior surfaces of the separating guide and of the curved supplementary plate.

14 Claims, 4 Drawing Figures

DEVICE FOR THE REPETITIVE COPYING OF ORIGINALS IN A COPIER

BACKGROUND OF THE INVENTION

1. Field of the Invention

The present invention relates to a device for repetitively copying originals in a copier. The device includes a pivotable separating guide which is moved to different positions for the separate discharge of, respectively, comparatively small format originals and comparatively large format originals.

2. Discussion of Related Art

A device of the above type is described in German Pat. No. 2,657,198 and in U.S. Pat. No. 4,269,409, in which the front edge of a copying original is guided through a plurality of revolutions past a copying station for repetitive copying by a gripping unit which moves along a closed path. In this copier, two vertically spaced discard-tables are provided beneath the repetitive copying device. The upper discard-table receives the comparatively small format originals, while the lower discard-table receives the comparatively large format originals. During repetitive copying, if the originals are large, for example DIN A 0 and A 1, the separating guide is pivoted away and an air nozzle, situated beneath the repetitive-copying device, is turned on. This nozzle applies blown air to the rear surface of the copying original. At the same time, a loop is formed by the copying original. This loop is not supported but, on the contrary, hangs freely downward. As this occurs, the stream of air is intended to distend the loop, in an appropriate manner, in order to eliminate excessively small radii in the loop, which can easily lead to sharp bends in the copying original.

With this arrangement, it has been found that the stream of air from the air nozzles yields results which are, as a rule, satisfactory for a certain type or quality of paper. However, when the paper quality deviates therefrom with regard to the stiffness, or when sharp bends, creases, hanging-strips or the like are present in the copying original, it is impossible to form a defined loop with a constant radius over its width. As a result, sharp bends occur in the copying original and, if the repetitive copying process is carried out on more than one occasion, these sharp bends are capable, after further repetitive-copying operations, of causing cracks and thereby rendering the copying original unusable. This is especially true in the case of brittle materials which are used, for example, if the operation involves the copying of old transparencies. Also, with this known device, large-format originals, such as DIN A 0 and A 1, can be damaged after leaving the transport rollers of the repetitive device, by falling down onto the discard-table.

SUMMARY OF THE INVENTION

An object of the present invention is to provide an improved device for the repetitive copying of originals, which device operates by a repetitive copying process which treats the material gently, irrespective of the nature of the particular material forming the copying original.

Another object of the present invention is to provide an improved device for the repetitive copying of originals which device operates such that the copying originals form a loop during the repetitive copying process which loop always has the same radius of curvature.

A further object of the present invention is to provide an improved device for the repetitive copying of originals wherein a loop compartment is formed to cradle the original being copied and a stream of air is directed against the original whereby the original is pressed by air against the inner surface of this compartment during the repetitive copying process.

In accordance with the above and other objects, the present invention comprises a pivotable separating guide for the separate discharging of comparatively small originals and comparatively large originals; a curved supplementary guide-plate; and means for pivoting said separating guide between a large format discharge position, a small format discharge position and a repetitive copying position, wherein, in the repetitive copying position, said separating guide forms a loop compartment with said supplementary guide-plate for receiving an original being repetitively copied.

The separating guide and the supplementary guide-piece are designed with a width and a length to match the largest original, to be used, e.g., DIN A 0 format.

In a further development of the invention, the separating guide has a shape which is generated by a series of discrete bends and is composed of planar portions which, in each case, adjoin one another at an obtuse angle. The separating guide can, of course, also be assembled from curved portions, which smoothly adjoin one another.

In the preferred embodiment of the invention, one of the ends of the separating guide is connected, by means of a lever system, to the shaft of a gear-motor, which, operating in conjunction with switches, positions the separating guide in a plurality of positions. For this purpose, the lever which is connected directly to the shaft of the gear-motor describes a circular path. Switches are arranged along the periphery of this path, which are capable of being actuated by the exposed end-face of the lever. The switches are, expediently, microswitches, of which the middle switch defines the repetitive-copying position, the switch located to the left of the middle switch defines the discharge-position for DIN A 1 and DIN A 0 formats of the copying original, and the switch situated on the right defines the discharge-position of the separating guide for DIN A 2, A 3 and A 4 formats of the copying original.

In order to blow air into the loop-compartment in a controlled manner, two air nozzles are located at the two sides of the loop-compartment which is formed by the separating guide and the supplementary guide-plate. The streams of air from these nozzles are directed in such a manner that, during the repetitive-copying process, they press an original, which is present as a loop in the loop-compartment, against the separating guide and the supplementary guide-plate.

The device of the present invention is used in combination with an electrophotographic copying machine, comprising an optical scanning device, and a transport mechanism for cyclically conveying an original past the optical scanning device. The transport mechanism comprises a gripping unit for engaging a leading edge of the original and transporting the edge over a closed path during the entire cycling operation. The pivotable separating guide for the separate discharging of comparatively small format originals and comparatively large format originals has an upper end and a lower end and contains a pivot axis on the upper end. The curved supplementary guide-plate is disposed below the transport mechanism and the means for pivoting the separating guide between a large format discharge position, a small format discharge position, and a repetitive copying position, wherein, in the repetitive copying position, said separating guide forms a loop compartment with said supplementary guide-plate for receiving an original being repetitively copied comprises a motor connected to the separating guide upper end by a linkage system.

The invention achieves the advantage whereby the copying original is forcibly guided inside a prescribed, limited loop-compartment, so that the loop always passes through the same radius of curvature, irrespective of the nature of the material of the copying original, as a result of which the occurrence of sharp bends, creases and tears is substantially avoided.

BRIEF DESCRIPTION OF THE DRAWINGS

In the text below, the invention is explained in more detail by reference to an illustrative embodiment which is represented in the drawings, in which.

DETAILED DESCRIPTION OF THE PREFERRED EMBODIMENT

Figure 1:
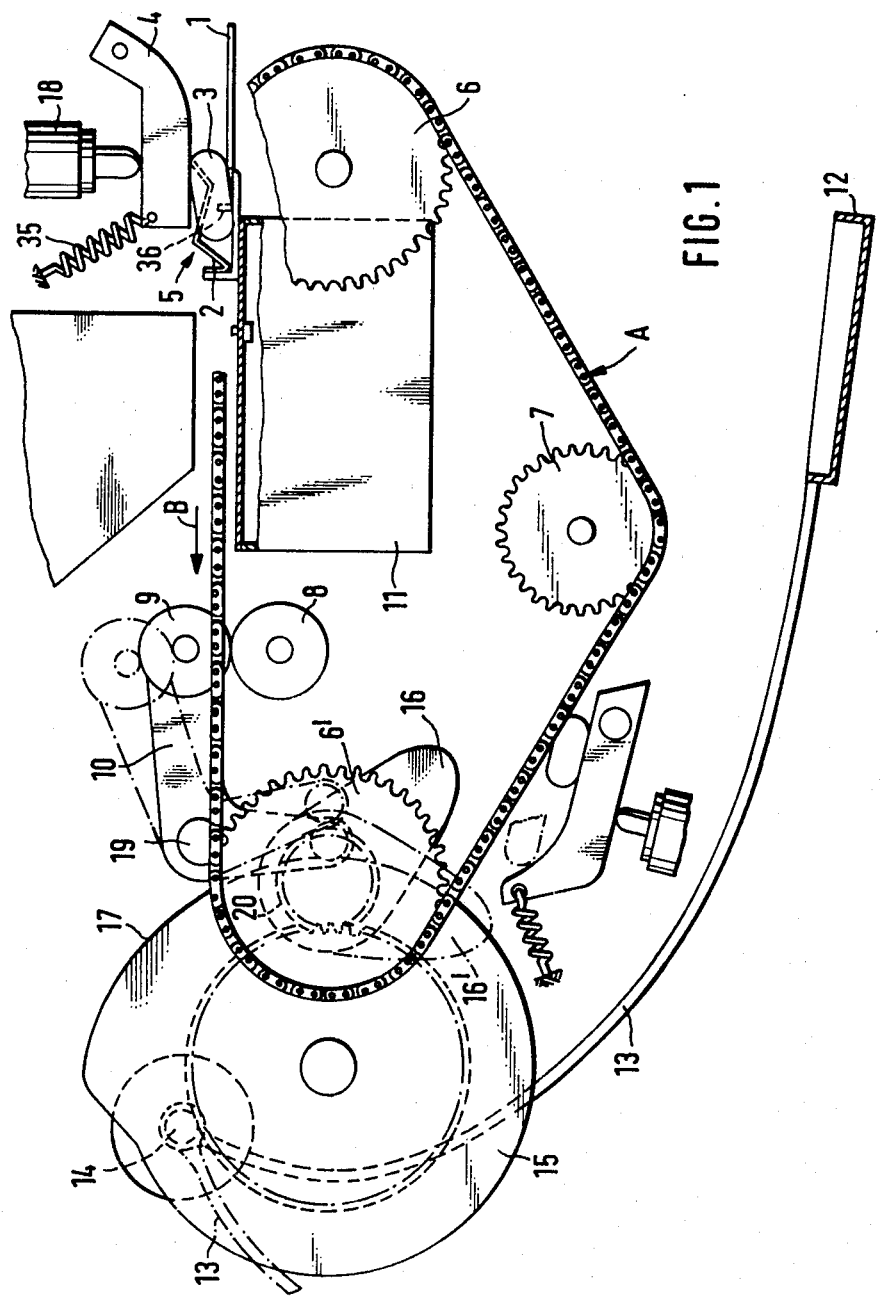
FIG. 1 shows, in a diagrammatic representation, a known repetitive-copying device.

The known repetitive-copying device according to German Pat. No. 2,657,198 and U.S. Pat. No. 4,269,409 is represented diagrammatically in FIG. 1, in which device a copying original 1 is transported by gripping unit 5, from right to left, in the direction of the arrow B. The gripping unit incorporates individually sprung grippers 2, which are spaced at equal intervals one from another and fastened on an L-shaped gripper-carrier, which carrier is attached transversely to the path A. In the waiting position of the gripper unit, the grippers 2 are opened. On introducing the copying original 1 into the gripping unit 5, the grippers close as soon as the copying original 1 is correctly aligned. The grippers 2 are preferably leaf springs, which are fastened to one limb of the L-shaped gripper-carrier. The leaf springs of the grippers 2 can, for example, be formed in a zig-zag shape.

At each side, the gripper unit 5 is connected to transport chains which are guided over a front pair of chainwheels 6 and over a rear pair of chainwheels 6', and which are held under tension by one chain-tensioning wheel 7 in each case. The front and rear chainwheels 6, 6' which are present in pairs, and the chain-tensioning wheels 7 are arranged with respect to one another in the shape of a triangle, the transport chains run endlessly around these wheels.

The opening and closing of the grippers 2 is effected by a cranked pivoting plate 4 which is located on each of the two sides of the gripping unit 5, in the plane of gripper-arms 3. Each pivoting plate 4 is capable of being pivoted into the path of the particular gripper-arm 3 to which it relates, or of being pulled out of this path, under the action of a solenoid 18 and a tension spring 35. The pivoting plate 4 is designed with a cranked shape, and can be pivoted about a shaft. The tension spring 35 acts on one of the ends of the pivoting plate 4, while the plunger of the solenoid 18 rests against the upper surface of one of the portions of the pivoting plate 4. The two solenoids 18 are actuated as soon as the front edge of the copying original 1 rests completely against stops 36. The plungers of the solenoids 18 push the pivoting plates 4 downward, against the co-action of the tension springs 35, as a result of which the gripper-arms 3 are pivotably rotated into the closed position as they pass under plates 4.

The free, rear edge of the copying original 1 is held down by a suction table 11, in the region in which the copying original is optically scanned. Lower transport rollers 8 and upper transport rollers 9 are arranged downstream of the optical scanning-region. These rollers are located opposite one another and distributed over the width of the path A. The continuously-driven shaft of the lower transport rollers 8 is mounted in a fixed position, while the axle of the upper transport rollers 9 can be pivoted by means of a lever 10 which is controlled by a cam-disk 15. The cam-disk 15 revolves in synchronism with the rear pair of chainwheels 6'. The cam-disk 15 is designed in such a manner that it causes lever 10 to pivot about its fulcrum 19 and lift the axle of the upper transport rollers 9 above the plane of path A as soon as the gripping unit 5 passes through the optical scanning-region. By this action, it is possible for the gripping unit 5 to move between the stationary, lower transport rollers 8 and the transport rollers 9 when the latter have been lifted from the path A. Once the gripping unit 5 has passed this point, the upper transport rollers 9 are lowered again and the further transport of the copying original 1 is then effected by means of the transport rollers 8 and 9.

In the vicinity of the cam-disk 15, outside the path A of the copying original 1, a separating guide 13 is attached to a shaft 14. The mode of operation of guide 13 will now be described in greater detail.

Fingers 16 seat on a shaft 20 of the rear chainwheels 6'. These fingers are distributed over the width of the path A with the pivoted-in position of these fingers 16 being represented by continuous lines and their pivoted-out position being represented by broken lines 16'. The pivoting of the fingers causes the copying original 1 being guided past to be pushed outwards and consequently facilitates the operation of discharging the large-format copying orignals 1 onto a lower discard-table 21 (FIG. 2) since this momentary outward push causes the front edge of the copying original 1 to slide out of the grippers 2, which have been opened by this point.

A further pivoting plate, which is not marked in more detail, is positioned near the path A beneath the rear pair of chainwheels 6'. This plate is constructed similarly to the pivoting plate 4. The pivoting rotation of this pivoting plate opens the grippers 2 as soon as the gripping unit 5 passes the pivoting plate. The transport rollers 8 and 9 can then convey the copying original 1 onwards, as far as the discharge point. When single copies are made, the grippers 2 are opened by means of the rear pivoting plate or, in the case of repetitive copying, the grippers 2 are opened during the final passage of the copying original through the copier. During the remainder of the passages through the copier during repetitive copying the rear pivoting plate is not pivoted into the path of the copying original, so that the grippers 2 remain closed.

The copying materials of comparatively small format, such as, for example, DIN A 2, A 3 and A 4, are discharged separately from the comparatively large formats, such as DIN A 0 and DIN A 1. This separation is effected by means of the separating guide 13 which, in the case of the comparatively small formats, is pivoted in the direction of the path A and, in the case of the large formats, is pivoted away, as represented by a dash-dotted line in FIG. 1.

Figure 2:
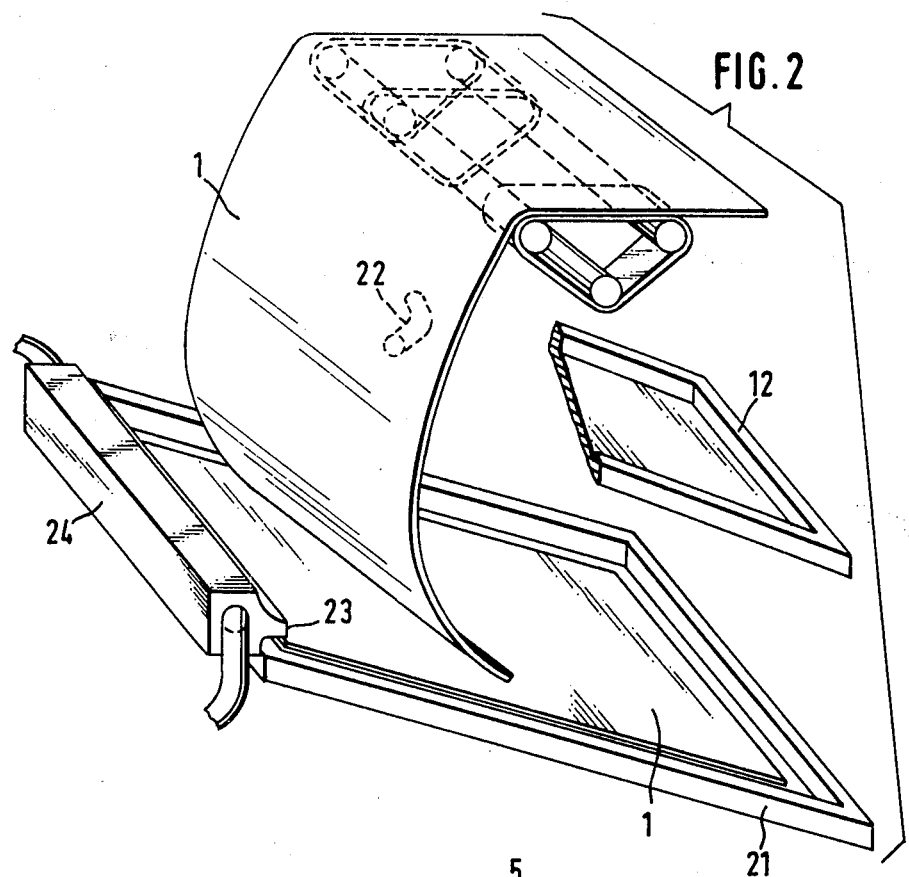
FIG. 2 shows the operation of depositing a large-format copying original onto a discard-table.

It can be seen from FIG. 2 that two discard-tables 12 and 21 are provided beneath the repetitive-copying device, of which the upper discard-table 12 receives the comparatively small formats, while the lower discard-table 21 receives the comparatively large formats. As soon as a single passage of the copying original takes place through the copier, in the case of a single copy, or as soon as the last passage of the copying original takes place through the copier, in the case of multiple copies, the rear pivoting plate has, as described above, opened the grippers 2 and the copying original 1 is discharged onto the upper discard-table 12 by means of the lower and upper transport rollers 8 and 9, respectively. In the case of large format originals, the separating guide 13 is pivoted away and an air nozzle 22 is turned on. This nozzle is situated beneath the repetitive-copying device and applies blown air to the rear surface of the copying original 1. The intention is to ensure, by this means, that the large-format copying original is not bent, but moves along a uniformly curved path towards and onto the lower discard-table 21. It is possible, for example, for one or more copying originals 1 to already be deposited on this table. An air chamber 24 is situated at a small distance above the discard-table 21. This chamber has an air nozzle 23, through which supporting air flows towards the copying original 1. This supporting air turns the front edge of the copying original 1 in the shape of an arc with respect to the surface of the discard-table 21 and permits perfect deposition, even when a plurality of copying originals from preceding copying processes are already stacked on the discard-table 21. The air nozzle 22 which delivers the blown air is customarily turned on whenever the copying original 1 passes afresh through the copier in order to form an air-cushion which prevents any possible stiffening effects from occurring from, for example, tears or sharp bends in the copying original. The air nozzle 23 for the supporting air is turned on and, after the last passage of the copying original 1 through the copier, is turned off following a certain time-delay. The air nozzle 22 for the blown air is turned on at the same time. This ensures that no creasing of the copying original 1 which is resting by the front edge on the lower discard-table 21 will occur. The lower and upper transport rollers 8 and 9, respectively, convey the copying original onward until its complete ejection from the repetitive-copying device.

Figure 3:
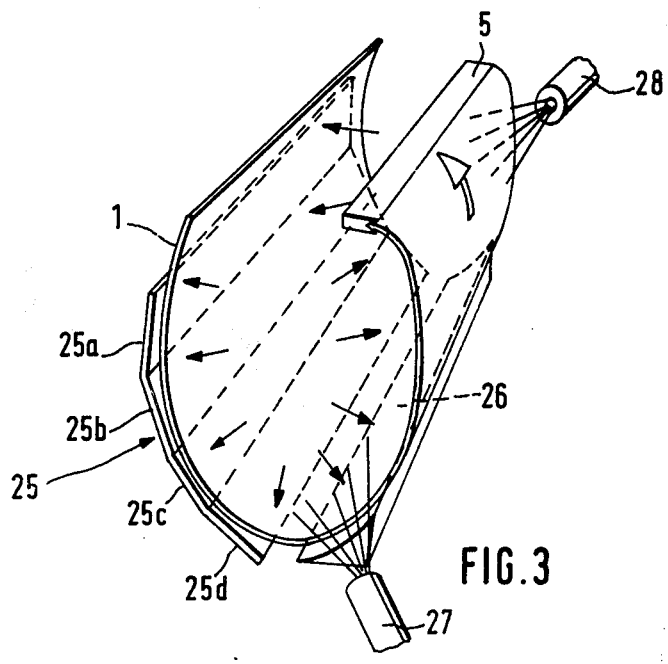
FIG. 3 shows a diagrammatic and perspective view of the repetitive-copying device according to the invention.

An embodiment of the invention is shown diagrammatically and in perspective in FIG. 3 and comprises a separating guide 25 and a supplementary guide-plate 26. In the repetitive-copying device according to FIG. 1, the separating guide 25 is installed in place of the separating guide 13 and interacts with the supplementary guide-plate 26 and air nozzles 27, 28 in the course of the operation in which the copying original is formed into a loop. The mode of operation of the repetitive-copying device, described previously, remains unchanged, except for the operation in which the copying original is formed into a loop. This operation takes place in a different manner. The separating guide 25 and the supplementary guide-plate 26 have a width and a length which are matched to the format DIN A 0 and are brought into operation only for the formats DIN A 0 and A 1. The separating guide 25 has a shape which is formed by a series of discrete bends joining planar portions 25a, 25b, 25c, 25d adjoining one another. Each bend is formed in an obtuse angle which can lie within the range from 145° to 165°.

The two air nozzles 27 and 28 are located at the two sides of the loop-compartment which is formed by the separating guide 25 and the supplementary guide-plate 26. The streams of air from these nozzles are directed in such a manner that, during the repetitive-copying process or during the passage of the copying original 1 through the loop-compartment, they press the copying original, which is present in the loop-compartment, against the inner surfaces of the separating guide 25 and of the supplementary guide-plate 26. The copying original is gripped at the front edge by the gripping unit 5, which draws it through the loop-compartment and conveys it onwards.

In FIG. 3, the separating guide 25 is shown to have a shape which is generated by a series of discrete bends, as has already been explained in the preceding text. However, it is also possible to configure the separating guide 25 in a manner whereby, instead of being assembled from planar portions, it is assembled from curved portions, each portion of which has a different radius of curvature, and wherein the individual portions adjoin one another in an essentially smooth manner.

Figure 4:
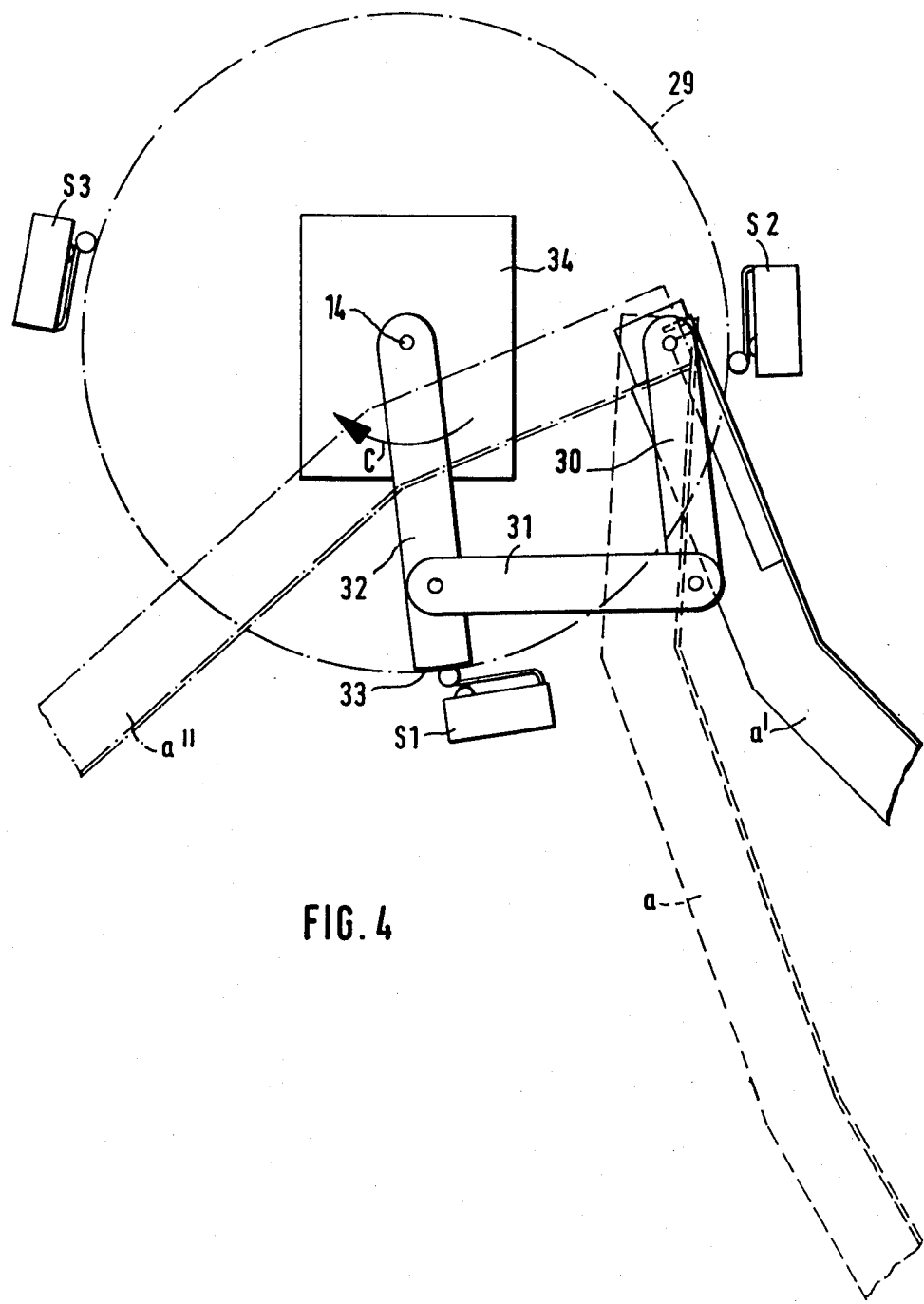
FIG. 4 shows the shifting mechanism of the repetitive-copying device according to FIG. 3.

The operation of shifting the separating guide 25 is described by reference to FIG. 4. One of the ends of the separating guide 25 is connected by means of a lever system 30, 31, 32 to the shaft 14 of a gear-motor 34. For the sake of better clarity, this gear-motor 34 is not shown in detail in FIG. 4. The lever 32, which is connected directly to the shaft 14 of the gear-motor 34, describes a circular path 29. Switches S1, S2 and S3 are arranged along the periphery of this path and are switched by the exposed end-face 33 of the lever 32 as soon as this end-face comes, in the course of the rotation of the lever 32, into contact with the respective switching contacts of the individual switches. The direction C of rotation of the lever system 30, 31, 32 or of the gear-motor 34 is clockwise. The switches S1, S2, S3 are preferably micro-switches. Of these, the middle switch S1 defines the repetitive-copying position a, the switch S3 located to the left of the middle switch defines the discharge-position a" for DIN A 1 and DIN A 0 formats of the copying original 1, and the switch S2 situated on the right defines the discharge-position a' of the separating guide 25 for DIN A 2, A 3 and A 4 formats of the copying original.

When copying from DIN A 0 and DIN A 1 formats, the separating guide 25 is brought into the repetitive-copying position, and forms, in conjunction with the supplementary guide-plate 26, the loop-compartment previously described. As soon as the last repetitive-copying operation has taken place in this loop-compartment, the separating guide 25 is pivoted away from the transport path of the copying original, so that the copying original 1 can, with the aid of the stream of supporting air from the air nozzle 23 (compare FIG. 2), be discharged in the direction of the discard-table 21.

In the case of the comparatively small DIN A 2, A 3 and A 4 formats, the additional operation of switching the separating guide 25 into the repetitive-copying position is unnecessary, since the operation of forming the copying original 1 into a loop is effected without the aid of the supplementary guide-plate 26, in the manner described in conjunction with FIG. 1.

The above description is set forth for the purpose of illustrating the present invention, but is not meant to be taken as exhaustive of the possible variations thereof. Numerous additions, changes and other modifications can be made to the present invention without departing from the scope thereof as set forth in the appended claims.

What is claimed is:

1. A device for the repetitive copying of originals in a copier, comprising:
    a pivotable separating guide for the separate discharging of comparatively small orginals and comparatively large originals;
    a curved supplementary guide-plate; and
    means for pivoting said separating guide between a large format discharge position, a small format discharge position and a repetitive copying position, wherein, in the repetitive copying position, said separating guide forms a loop compartment with said supplementary guide-plate for receiving an original being repetitively copied.

2. A device as claimed in claim 1, wherein said separating guide and said supplementary guide-plate have a width and a length which are matched to the largest originals to be repetitively copied.

3. A device as claimed in claim 1, wherein said separating guide has a shape which is composed of planar portions which adjoin one another at obtuse angles.

4. A device as claimed in claim 1, wherein said means comprises a lever system connected to the shaft of a gear-motor, said lever system being attached to said separating guide.

5. A device as claimed in claim 4, wherein said lever system includes a lever which is connected directly to the shaft of the gear-motor and describes a circular path, and wherein said means further includes switches arranged along the periphery of said path, said switches being positioned for actuation by said lever connected directly to said shaft.

6. A device as claimed in claim 5, wherein the switches are microswitches and include a middle switch which defines said repetitive-copying position, a switch located to the left of the middle switch which defines said large format discharge-position, and a switch situated on the right of said middle switch which defines said small format discharge position.

7. A device as claimed in claim 1, and further including a blowing means for blowing air against the inner surface of said loop compartment when said separating guide is in the repetitive copying position.

8. A device as claimed in claim 7, wherein said blowing means include two air nozzles located at two sides of the loop-compartment which is formed by the separating guide and the supplementary guide-plate, the streams of air from these nozzles being directed such that, during a repetitive-copying process, they press an original, which is present as a loop in the loop-compartment, against the separating guide and the supplementary guide-plate.

9. An electrophotographic copying machine, comprising:
    an optical scanning device;
    a transport mechanism for cyclically conveying an original past said optical scanning device, said transport mechanism comprising a gripping unit for engaging a leading edge of said original and transporting said edge over a closed path during the entire cycling operation;
    a pivotable separating guide for the separate discharging of comparatively small format originals and comparatively large format originals;
    a curved supplementary guide-plate; and
    means for pivoting said separating guide between a large format discharge position, a small format discharge position, and a repetitive copying position, wherein, in the repetitive copying position, said separating guide forms a loop compartment with said supplementary guide-plate for receiving an original being repetitively copied.

10. The machine of claim 9, and further including a blowing means for directing blown air against the inner surface of said loop compartment when said separating guide is in the repetitive copying position.

11. The machine of claim 9, wherein said supplementary guide plate is disposed below said transport mechanism.

12. The machine of claim 9, wherein said pivotable separating guide has an upper and a lower end and contains a pivot axis on said upper end.

13. The machine of claim 12, wherein said means comprises a motor and a linkage system connected between said motor and said upper end of said separating guide.

14. The machine of claim 12, wherein said means further includes a plurality of switches defining said repetitive copying position and said discharge positions, said switches being positioned for operation by said linkage system.

* * * * *